United States Patent [19]
Chessman et al.

[11] Patent Number: 5,270,999
[45] Date of Patent: Dec. 14, 1993

[54] APPARATUS AND METHOD FOR REDUCING DISK DISTORTION

[75] Inventors: H. Ross Chessman, Erie; F. Eugene Dion, Longmont; Mark A. Swenson, Broomfield; Aaron MacPherson, Fort Collins; Richard K. Schaefer, Loveland, all of Colo.

[73] Assignee: Conner Peripherals, Inc., San Jose, Calif.

[21] Appl. No.: 624,747

[22] Filed: Dec. 10, 1990

[51] Int. Cl.$^5$ .......................................... G11B 17/028
[52] U.S. Cl. ...................... 369/290; 369/270; 369/271
[58] Field of Search ............ 369/75.2, 270, 282, 369/290, 271

[56] References Cited

U.S. PATENT DOCUMENTS

| | | | |
|---|---|---|---|
| 3,356,310 | 12/1967 | Yokota | 242/68.3 |
| 3,782,841 | 1/1974 | Winckelhaus | 403/373 |
| 4,166,622 | 9/1979 | Rager | 369/270 |
| 4,318,309 | 3/1982 | Bremer, Jr. | 74/574 |
| 4,347,599 | 8/1982 | Vitale | 369/270 |
| 4,502,136 | 2/1985 | Rickert et al. | 369/271 |
| 4,514,839 | 4/1985 | Eisemann | 369/270 |
| 4,539,614 | 9/1985 | Thompson | 360/99 |
| 4,630,156 | 12/1986 | Saito | 360/133 |
| 4,715,485 | 12/1987 | Roston et al. | 192/106.2 |
| 4,755,981 | 7/1988 | Ekhoff | 369/270 |
| 4,768,185 | 8/1988 | Camerik | 369/270 |
| 4,831,612 | 5/1989 | Kurihara | 369/75.2 |

FOREIGN PATENT DOCUMENTS

| | | | |
|---|---|---|---|
| 0159100 | 10/1985 | European Pat. Off. | 369/270 |
| 0194181 | 11/1983 | Japan | 369/270 |
| 0117563 | 5/1984 | Japan | 369/270 |
| 2139803 | 11/1984 | United Kingdom | 369/270 |

Primary Examiner—Robert A. Weinhardt
Attorney, Agent, or Firm—Sheridan Ross & McIntosh

[57] ABSTRACT

A retainer assembly (10) comprises a retainer member (24) and a spring (36). The spring (36) works in combination with a conical surface (34) on the hub (12) and a conical surface (28) on the retainer member (24). Depending upon magnitudes of defined angles A and W, the assembly (10) resists any axial force (42) that may act to disengage the disk (14) from the hub (12). The angles A and W are variable so long as a coefficient of friction $\mu$ between the conical surface (34) or the conical surface (28) and the ring (36) is greater than the tangent of one half the angle W.

11 Claims, 6 Drawing Sheets

APPARATUS AND METHOD FOR REDUCING DISK DISTORTION

FIELD OF THE INVENTION

This invention relates to disk drives and in particular to an apparatus and method for reducing distortion of the read/write surface of an information storage disk when the disk is connected to a motor flange.

BACKGROUND OF THE INVENTION

Information storage disks generally have planar surfaces with a center hole therethrough for placement on a motor driven hub. When the disk is placed on the motor driven hub, it is necessary to use an assembly that holds the disk securely thereon. If the drive containing the disk is dropped, there is a tendency for the disk to disengage from the hub which may result in damage to the disk or other parts of the disk drive.

Many arrangements have previously been devised to hold a disk onto a motor hub. One problem inherent with the use of a clamp to secure a disk in place lies in the fact that disks and clamps do not have perfectly planar engaging surfaces. Therefore, upon placement of a disk having an imperfectly planar surface between a hub flange having an imperfectly planar surface and a clamp having an imperfectly planar surface, disk distortion can occur. As the clamp presses down upon a disk planar surface, the disk is "squeezed" between the clamp and the flange. This squeezing action causes any surface irregularities to distort the planar surface of the disk at the clamping interface and this distortion extends radially outward into the read/write surface. Any distortion of the disk read/write surface may result in lost or distorted data.

A disk clamping device is disclosed in U.S. Pat. No. 4,347,599 to Vitale, issued on Aug. 31, 1982. The Vitale device provides a spindle clamp assembly for securely clamping an information disk in a precisely centered position upon a rotatable drive spindle. An expansible sleeve is provided to cooperate with a wedge collet for uniform radial expansion of the sleeve and thus centering of the disk upon a spindle. Spring loaded locking means are also provided to secure the disk between a clamping surface and a flange on the motor hub. The Vitale device precisely centers a disk yet is subject to the very problem identified above of potential distortion of the disk by the squeezing action between the clamping surface and the flange.

Another clamping device is disclosed in U.S. Pat. No. 4,539,614 to Thompson, issued on Sep. 3, 1985. The Thompson device includes a clamping lever for use with a floppy disk drive to align and clamp the disk to a drive spindle. Activation of a handle causes a rotational clamping device to move from a position spaced apart from the disk to a position on the disk for clamping of the disk between the clamping device and a hub portion. Thus, this device also "squeezes" the disk between the clamping device and the hub portion which may cause distortion of the read/write surface of the disk.

Another apparatus for centering and clamping a disk is disclosed in U.S. Pat. No. 4,502,136 to Rickert et al., issued on Feb. 26, 1985. The Rickert device uses an elevator to raise a disk into centering contact with a drive spindle. As the elevator raises the disk into centered engagement with the spindle, a magnet on a portion of the elevator engages a metallic ring on a spindle platform with the disk therebetween. The magnet and metallic ring thus clamp the disk therebetween securing the disk in position. This device, like the Vitale and the Thompson devices, can cause distortion of the read/write surface of the disk by the squeezing of the disk therebetween. Thus, it would be advantageous to provide a method and apparatus for securing a disk to a drive hub which reduces the likelihood of distortion of the disk and therefore reduces the occurrence of inaccuracies in the read/write data of the disk.

SUMMARY OF THE INVENTION

The present invention disclosed herein comprises method and apparatus for reducing distortion of an information storage disk. The present invention results in the securing of a storage disk to a motor hub and flange with a reduced likelihood of disk read/write errors due to disk distortion.

In accordance with one aspect of the present invention, an assembly for securing a disk to a hub is provided. The hub has a flange forming a planar surface for receiving one planar surface of the disk. A circumferential cut-out is formed in the hub above the disk for receiving a spring. A retainer member is positioned on a surface of the disk opposite the flange of the hub to place the disk therebetween. The spring is then inserted into the circumferential cut-out to hold the retainer member in position relative to the disk.

In accordance with another aspect of the present invention, the circumferential cut-out is formed at an angle relative to a longitudinal axis through the hub. Additionally, the retainer member is generally polygonal in cross-sectional shape having one surface thereof formed at a second angle relative to the longitudinal axis of the hub. Upon insertion of the spring in the cut-out, the spring attempts to return to its original free state and is thus pulled deeper into the cut-out until either it is stopped by the surface of the retainer member or it returns to its free state.

By varying the angles of the cut-out and the side of the retainer member, axial forces from the retainer member to the disk may be varied. It is possible to adjust the angles and the specific arrangement of the spring such that only the weight of the retainer member provides any axial force on the disk. Thus, while the disk is securely restrained from accidental dislodgment from the hub, the likelihood of distorting the disk by squeezing the disk between the flange and the retainer member is greatly reduced.

In accordance with another aspect of the invention, a device is provided between the inner diameter of a disk center hole and the hub to compensate for temperature changes and for absorbing possible vibrations or shock. This device serves to reduce the likelihood of disk distortion from variances in the properties of the disk material and the hub material and for absorbing any forces therebetween. For example, if the disk were tightly fitted to the hub, temperature changes in the disk and/or the hub might cause distortion of the disk due to different material expansion/contraction characteristics. Additionally, if the disk and hub were tightly fitted, any vibration from the hub (or its related parts) could be unwantedly transferred directly to the disk. Thus, the device also serves to absorb vibration between the hub and the disk.

In one embodiment, the device comprises an elastomeric ring such as an O-ring fitted into a circumferential groove in the hub. The ring fills a gap between the hub and the disk to ensure proper positioning of the disk on the hub by providing a restoring force to minimize disk eccentricity. Additionally, the ring helps absorb vibrations and shocks between the hub and the disk as well as compensate for any differences in material characteristics.

In another embodiment, the device comprises adhesive applied to a plurality of points between the hub and the disk. The adhesive preferably comprises an ultraviolet light cured adhesive which remains flexible through temperature variations, shock and vibrations. In one embodiment, three evenly spaced (120° apart) points of the adhesive are applied between the hub and the disk.

It is a technical advantage of the present invention that distortion of the disk is reduced by reducing unwanted axial forces on the disk. The disk is securely held in place yet axial forces from the retainer assembly of the present invention to the disk are substantially reduced. It is a further technical advantage of the present invention that a device is provided between the disk and the hub to compensate for variations in the characteristics of the materials and for absorbing shock and vibration.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
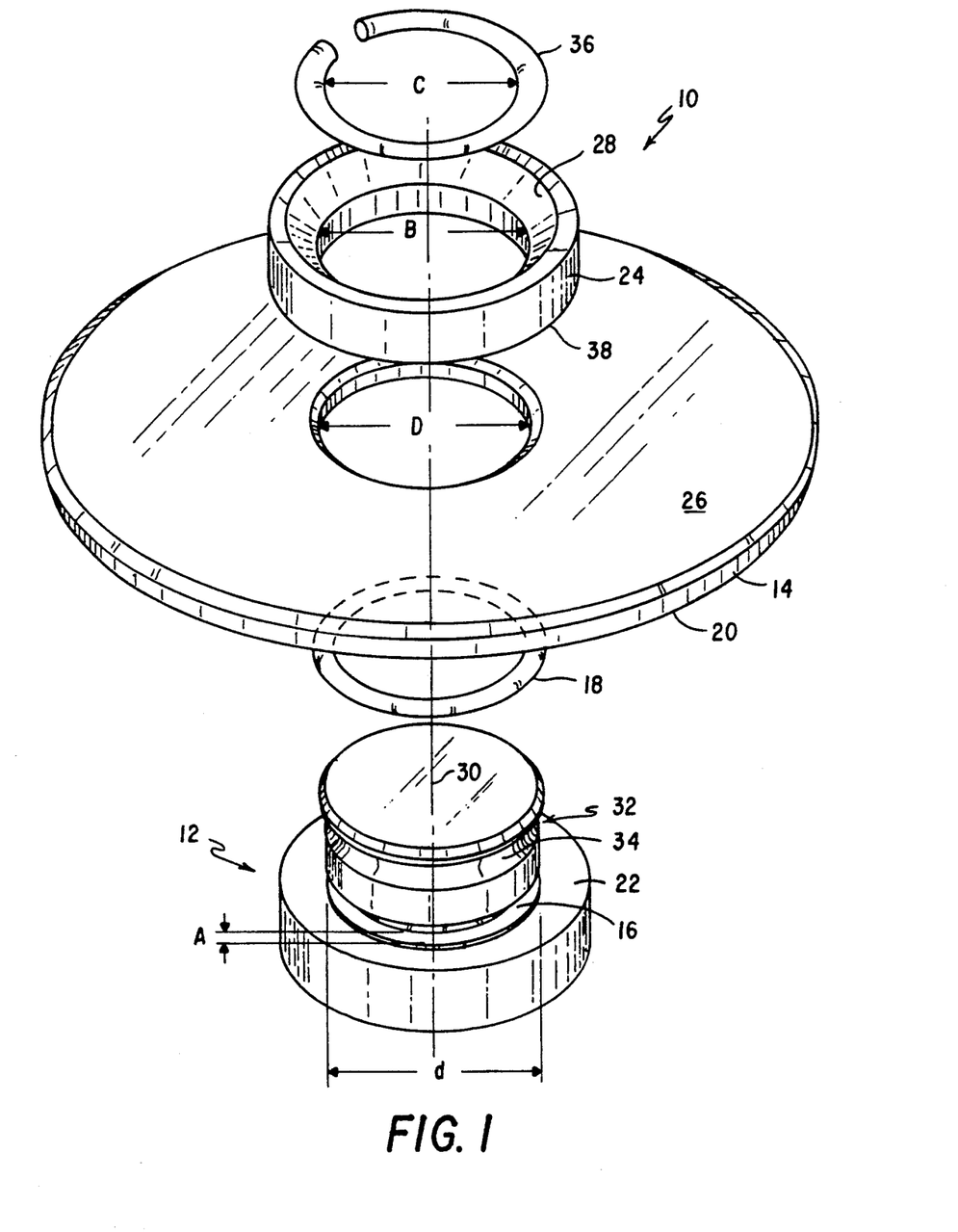
FIG. 1 is an exploded perspective view of a disk retainer assembly constructed in accordance with the preferred embodiment of the present invention.

Referring to FIG. 1, an exploded perspective view of a disk retainer assembly for reducing disk distortion is generally identified by the reference numeral 10. A spindle or hub 12 is rotationally driven by a motor (not shown). The hub 12 may comprise, for example, stainless steel and has a diameter d which may be approximately equal to or slightly less than a diameter D of a disk 14. In the embodiment shown in FIG. 1, the diameter d is slightly smaller than the diameter D.

The hub 12 has a circumferential groove 16 formed therein for receiving a ring 18 such as, for example, an elastomeric O-ring. The elastomeric O-ring 18 has a cross-sectional diameter which is at least slightly larger than depth A of the groove 16. Thus, when the disk 14 is positioned on the hub 12 such that a bottom surface 20 thereof rests upon a flange 22 of the hub 12, the ring 18 is slightly compressed radially inwardly by the disk 14.

The ring 18 serves to center the disk 14 on the hub 12, compensate for any material characteristic variations, and helps absorb vibration and/or shock. For example, if the hub 12 and the disk 14 are subjected to temperature changes, the materials from which they are constructed may have different rates of expansion and/or contraction. Thus, the ring 18 serves to compensate for any variances therebetween due to temperature changes. The ring 18 also absorbs vibrations which may be caused by the drive motor or other operating devices associated therewith. If the hub 12 is subjected to a shock such as, for example, by being dropped, the ring 18 will help absorb the shock and reduce transference thereof to the disk 14. Additionally, due to the flexibility of the ring 18, relative movement of the disk 14 with respect to the hub 12 is corrected, i.e., the ring 18 will cause the disk 14 to return to its original centered position.

After the disk 14 is placed on the flange 22 of the hub 12, a retainer member 24 is placed thereover adjacent a top surface 26 of the disk 14. The retainer member 24 has an inside diameter B which is approximately equal to the outside diameter d of the hub 12. The retainer member 24 has a polygonal cross-sectional shape with a conical surface 28 formed at an angle relative to a longitudinal axis 30 through the hub 12 and a face 38 generally parallel to the surface 26 of the disk 14. The retainer member 24 may comprise any suitable material such as, for example, stainless steel.

The hub 12 has a circumferential cut-out 32 spaced apart from the flange 22 and positioned above the top surface 26 of the disk 14 when placed thereon. The circumferential cut-out 32 is formed with a conical surface 34 at an angle relative to the longitudinal axis 30. When the disk 14 is placed on the hub 12 and the retainer member 24 placed thereover, a channel is formed between the conical surface 28 of the retainer member 24 and the conical surface 34 of the circumferential cut-out 32.

A spring 36 which may comprise, for example, a split stainless steel ring, fits within the channel thus formed. As will be subsequently described in greater detail, the angle of the conical surface 28, the angle between the surface 28 and the conical surface 34, and the cross-sectional diameter of the spring 36 may be appropriately adjusted to substantially reduce any axial force on the disk 14 yet securely retain the disk 14 against accidental removal from the hub 12. Additionally the spring 36 has a free-state internal diameter C which may be greater than or less than the hub diameter d. If the diameter C is less than the diameter d, the spring 36 must be expanded to fit over the hub 12 and will go deeper into the cut-out 32 until reaching its free state or it is physically restrained. If the diameter C is greater than the diameter d, the spring 36 must be contracted to fit into the cut-out 32 and thus would be held by the retainer member 24 when the spring 36 attempts to expand back to its free state.

Figure 7:
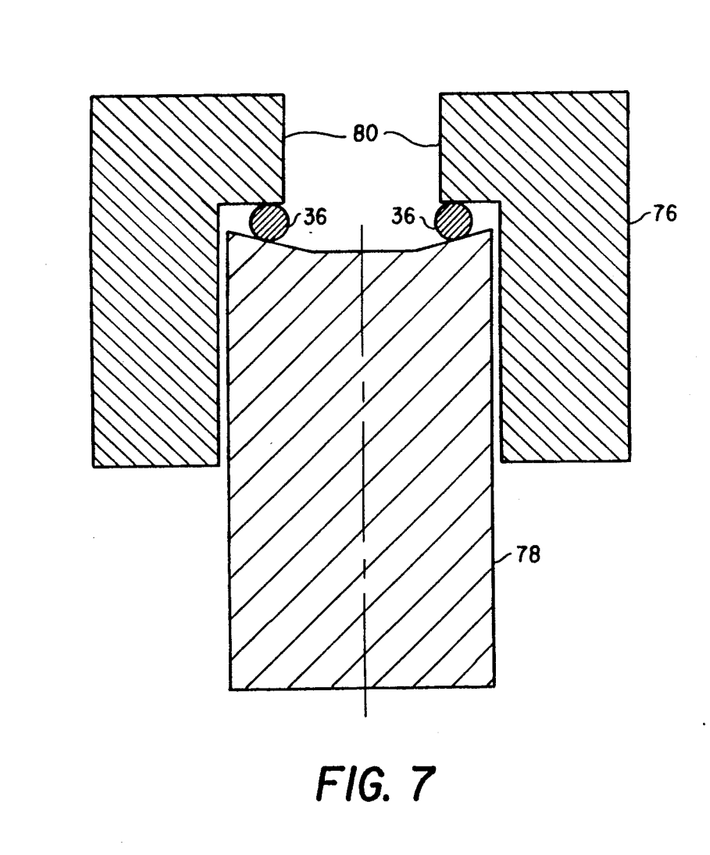
FIG. 7 is a cross-sectional view of one alternative embodiment having an expandable spring.
Figure 8:
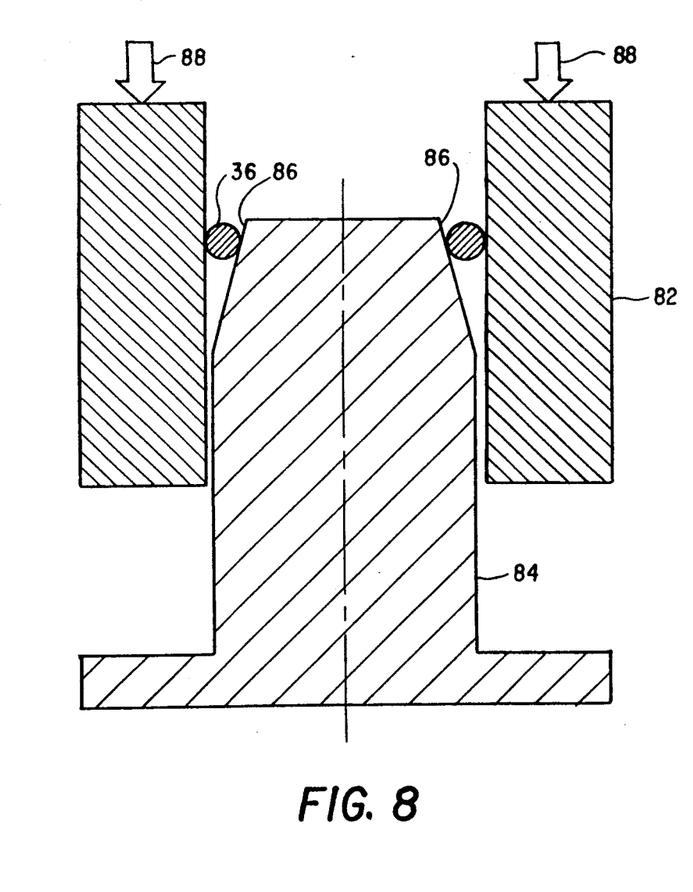
FIG. 8 is a cross-sectional view of another alternative embodiment having an expandable spring.

Referring to FIGS. 7 and 8, embodiments of the spring 36 with the diameter C greater than the diameter d are illustrated. Referring first to FIG. 7, a retainer member 76 is positioned around a hub 78, the retainer member 76 has an overhang 80 directed radially inwardly toward the hub 78's centerline. As the spring 36 expands radially outwardly, it will be forced deeper into the space between the hub 78 and the overhang 80.

Referring next to FIG. 8, a retainer member 82 is positioned around a hub 84 which has an inwardly tapered end 86. The spring 36 fits in a space provided between the tapered end 86 and the retainer member 82. As the spring 36 attempts to expand radially outwardly, it will tend to help the retainer member 82 resist axial forces in a direction indicated by an arrow 88.

Figure 2:
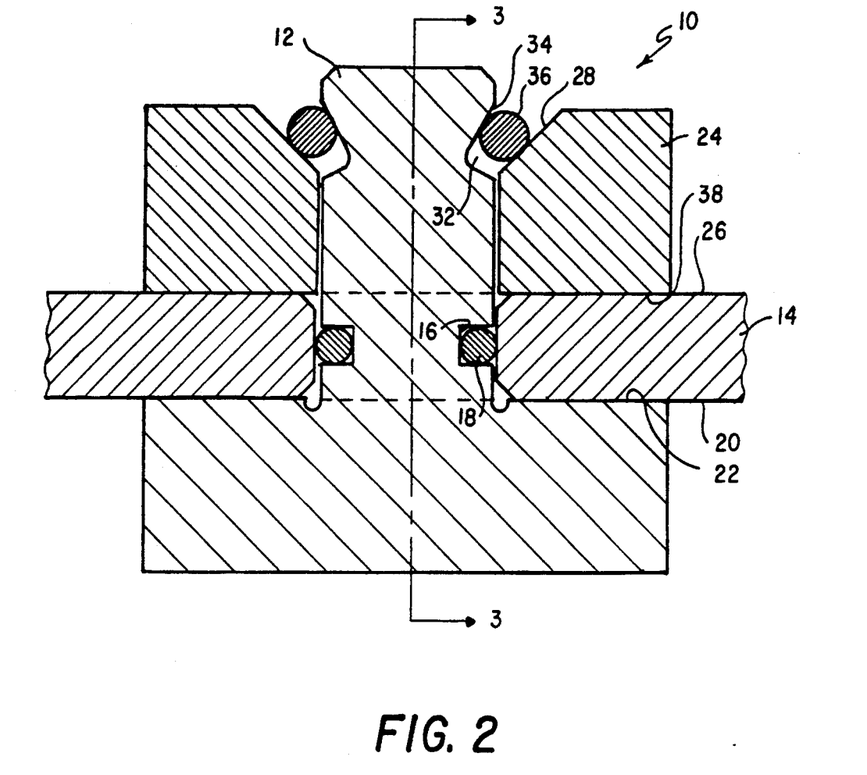
FIG. 2 is a cross-sectional view of FIG. 1.

Referring to FIG. 2, a cross-sectional view of the assembly 10 is shown. As can be seen, the bottom surface 20 of the disk 14 rests on the flange 22 of the hub 12. The face 38 of the retainer member 24 is adjacent the top surface 26 of the disk 14. The spring 36 is fit between the conical surface 28 of the retainer member 24 and the conical surface 34 of the circumferential cut-out 32 of the hub 12.

In operation, the disk 14 is placed over the hub 12 with the bottom surface 20 thereof on the flange 22. The ring 18 centers and maintains concentricity between the disk 14 and the hub 12. The retainer member 24 is placed over the disk 14 with the bottom surface 38 adjacent the top surface 26 of the disk 14. The spring 36 (in the case where the diameter C is less than the diameter d) is expanded to fit around the hub 12 and then allowed to attempt to return to its free state within the circumferential cut-out 32. As the spring 36 attempts to return to its free state, it works itself deeper into the cut-out 32 between the conical surface 28 and the conical surface 34. Depending upon the angle between the conical surface 28 and the conical surface 34, the ring 36 will provide an axial force parallel to the longitudinal axis 30 to hold the disk 14 o the hub 12. By adjusting the angle of the conical surface 34 and the angle between the conical surface 28 and the conical surface 34, the amount of axial force may be controlled to substantially reduce the likelihood of distortion of the disk 14 yet securely retain the disk 14 on the hub 12 in the event of shock or any other disruptive force.

Figure 3:
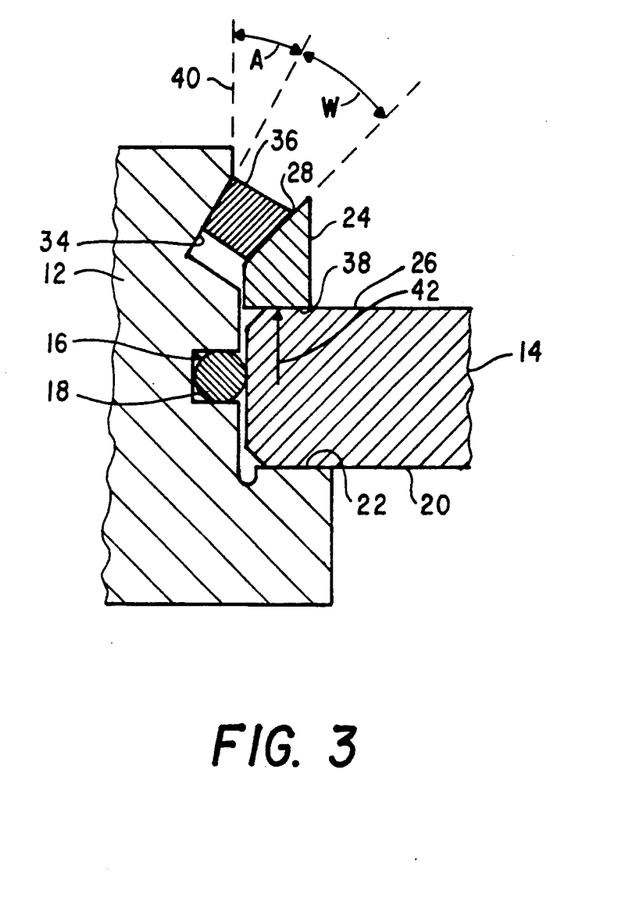
FIG. 3 is a cross-sectional view of the assembly of FIG. 2 along the line 3—3.

Referring to FIG. 3, the angular relationships between the conical surface 28 and the conical surface 34 are more fully described. The angles are formed relative to the longitudinal axis 30 as depicted in FIG. 3 by a vertical line 40 which is parallel to the axis 30. The angle of the conical surface 34 of the cut-out 32 is defined by an angle A relative to the line 40. A wedge angle W is defined by the angle between the conical surface 34 and the conical surface 28. The angles A and W may vary, as will be subsequently described in greater detail, as long as a coefficient of friction $\mu$ between the spring 36 and either the hub 12 or the retainer member 24 is greater than the tangent of one half the angle W. So long as the coefficient of friction $\mu$ is greater, an axial force on the retainer member 24 in a direction indicated by an arrow 42 will not result in removal of the retainer member 24 from the hub 12. Additionally, as shown in FIG. 3, the spring 36 may have other cross-sectional shapes such as a general wedge shape approximately matching the shape of the cut-out 32.

Figure 4:
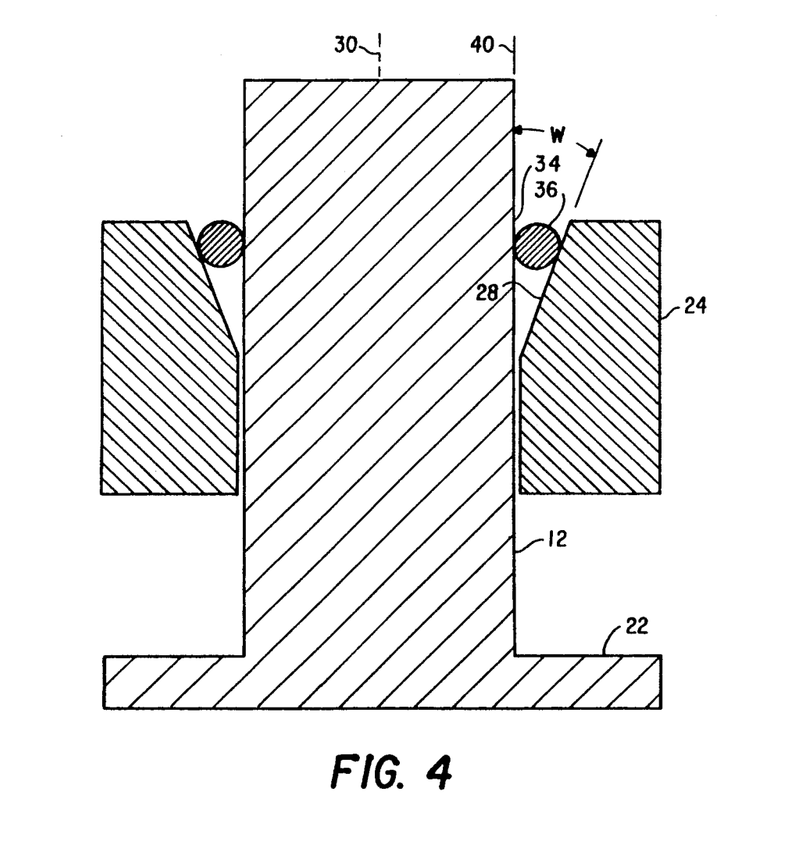
FIG. 4 is a cross-sectional view of one extreme angular limitation of the present invention.
Figure 5:
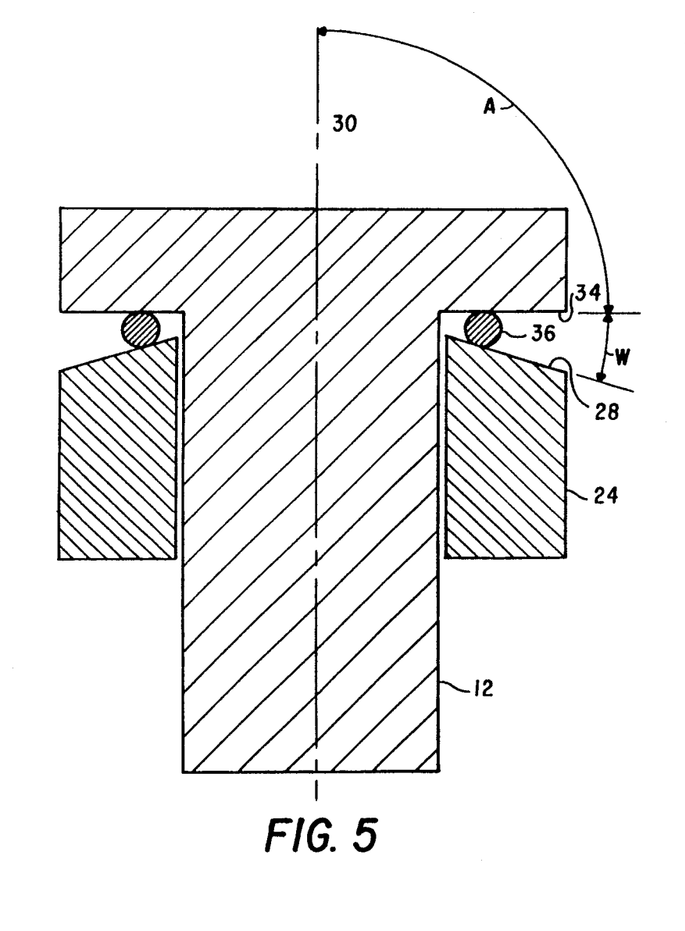
FIG. 5 is a cross-sectional view of another extreme angular limitation of the present invention.

Referring to FIGS. 4 and 5, two extreme limits of the angle A are illustrated. Referring first to FIG. 4, there is no cut-out 32 and thus the conical surface 34 is vertical with the angle A equal to zero degrees. The value of the angle W is dependent upon the coefficient of friction $\mu$ between the spring 36 and the conical surface 34 or the conical surface 28 (i.e., the lowest coefficient of friction is used to determine the angle W). As long as the coefficient of friction $\mu$ is greater than the tangent of one half of the angle W, the spring 36 will retain the ring 24 against any movement with respect to the hub 12 which would tend to remove the retainer member 24 from the hub 12.

Referring to FIG. 5, a second extreme is illustrated. In FIG. 5, the conical surface 34 is perpendicular to the longitudinal axis 30 and the angle A thus equals 90°. The angle W must be determined by the previously defined relationship wherein the coefficient of friction $\mu$ must be greater than the tangent of ½ the angle W, or more appropriately the angle $W < 2 \times [\arctan (\mu)]$. Thus it can be seen that the angle A may have a range of values from 0° to 90°, while the angle W can have a range of values that satisfy the relationship, $W \leq 2 \times [\arctan (\mu)]$ i.e., the angle W must be less than or equal to twice the arc tangent of the coefficient of friction).

For example, if the hub 12, the spring 36 and the retainer member 24 are all stainless steel, the coefficient of friction would be approximately 0.4. Twice the arc tangent of 0.4 equals approximately 43.6°, and therefore, the angle W must be less than or equal to 43.6°.

In a preferred embodiment, as shown in FIG. 2, the cross-sectional diameter of the stainless steel spring 36 is 0.6 mm, the angle A=35 and the angle W=20°. These values have been found through testing to produce a substantially reduced axial force on the disk 14 and yet provide sufficient retention of the disk 14 on the hub 12. For best results, the angle A should have a range of 30.30°-35°, the angle W should have a range of 15°-20° and the cross-sectional diameter of the spring 36 should be 0.5-0.6 mm.

Figure 6:
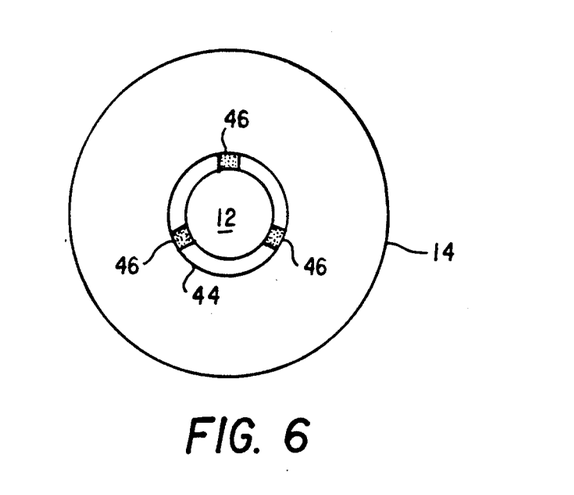
FIG. 6 is a top plan view of an alternative embodiment of the device for temperature compensating and for absorbing possible shocks and/or vibrations.

Referring to FIG. 6, an alternative embodiment to the use of the O-ring 18 is illustrated. In FIG. 6, a plurality of adhesive points 46 are applied between the hub 12 and the inner circumference 44 of the disk 14. The plurality of adhesive points 46 may comprise, for example, three equally spaced (i.e. 120° apart) points of ultraviolet curable adhesive. The adhesive may comprise, for example, Loctite 370. The adhesive points 46 will remain flexible throughout temperature variations, and shock/vibration from the disk operating apparatus. The adhesive points 46 provide a compliant interface between the hub 12 and the inside circumference 44 of the disk 14 and therefore dampen the effects of any forces between the hub 12 and the disk 14.

Figure 9A:
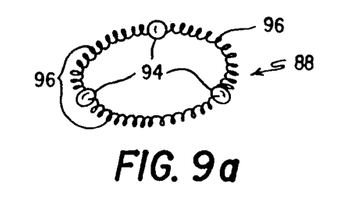
FIGS. 9a b, and c are alternative spring embodiments.
Figure 9B:
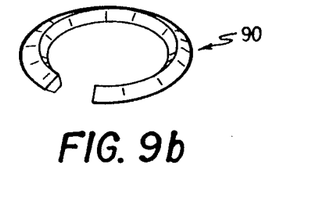
Figure 9C:
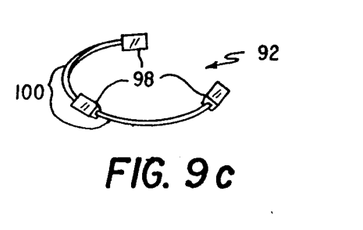

Referring to FIGS. 9a-c, 10a-c and 11a-c, alternative embodiments of the spring, the retainer member, and the hub, respectively, are illustrated. Referring first to FIG. 9a-c, springs 88, 90 and 92 have various alternative configurations intended to illustrate any number of possible variations which will function with the present invention. The spring 88 in FIG. 9a comprises a plurality of generally round portions 94 interconnected by connector members 96 which may comprise coiled springs. The spring 90 in FIG. 9b more fully illustrates the wedge cross-sectional shape previously described above with reference to FIG. 3. The spring 92 of FIG. 9c comprises a plurality of wedge shaped pads 98 interconnected by connector members 100 which may comprise spring steel.

Figure 10A:
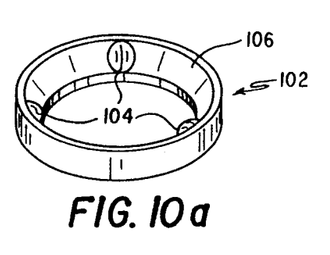
FIGS. 10a, b, and c are alternative retainer member embodiments.
Figure 10B:
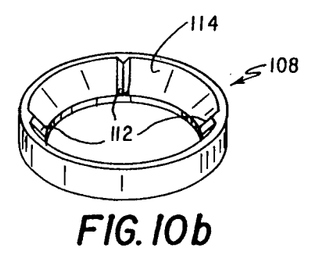
Figure 10C:
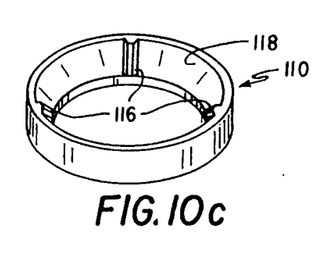

Referring to FIGS. 10a-c, variations of the retainer member are illustrated. In FIG. 10a, a retainer member 102 is similar to the retainer member 24 described above but further including a plurality of arcuate protrusions 104 which are evenly spaced on a surface 106. Retainer members 108 and 110 in FIGS. 10b and 10c also have a plurality of spaced protrusions on surfaces thereof. A plurality of line contact protrusions 112 are formed at an angle relative to the longitudinal axis 30 equal to angle A+angle W (see FIG. 3) on a surface 114 of the retainer member 108 while a plurality of area contact protrusions 116 have conical faces which form an angle relative to the longitudinal axis 30 equal to angle A+angle W (see FIG. 3) and are formed on a surface 118 of the retainer member 110. The protrusions 104, 112 and 116 all serve to provide contact between their respective retainer members and a spring 36, as previously described above.

Figure 11A:
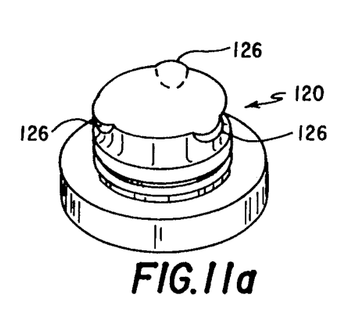
FIGS. 11a, b and c are alternative hub embodiments.
Figure 11B:
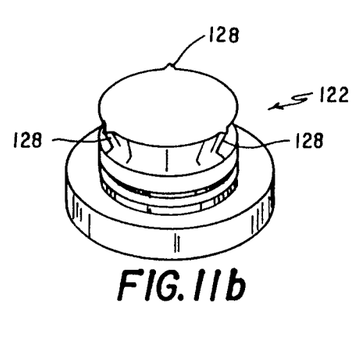
Figure 11C:
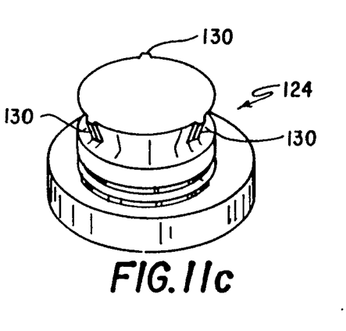

Referring to FIGS. 11a-c, hubs 120, 122 and 124 are shown. The hub 120 of FIG. 11a has a plurality of arcuate protrusions 126 thereon similar to the arcuate protrusions 104 of FIG. 10a. The hubs 122 and 124 have line protrusions 128 and conical surface protrusions 130, respectively, similar to the protrusions 112 and 116 of FIGS. 10b and 10c but formed at an angle relative to the longitudinal axis 30 equal to angle A (see FIG. 3).

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. An assembly for securing a disk to a hub, comprising:
   means for receiving the disk, said means for receiving includes a hub with a first surface;
   means for retaining the disk to said means for receiving, said means for retaining comprising spring means and a retainer member that has a second surface that is at an angle to said first surface, said spring means being positioned between said first surface and said second surface, wherein substantially all points of contact between said spring means and said first surface are located on one parametric path and substantially all points of contact between said spring means and said second surface are located on another on another one parametric path, and wherein said another one parametric path has the only points of contact between said retainer member and said spring means.

2. The assembly of claim 1, wherein said hub comprises:
   a cut-out for receiving said spring means.

3. The assembly of claim 2, wherein said cut-out comprises:
   a conical surface formed at an angle relative to a longitudinal axis through the hub.

4. The assembly of claim 3, wherein said angle comprises:
   one value of a range of values from approximately 0. to 90°.

5. The assembly of claim 1, wherein said spring means comprises:
   a split ring.

6. The assembly of claim 5, wherein said split ring comprises stainless steel.

7. The assembly of claim 1, wherein said spring means further comprises:
   a circular cross-sectional shape having a cross-sectional diameter of approximately 0.5–0.6 millimeters.

8. The assembly of claim 1, wherein said retainer member comprises:
   a stainless steel ring.

9. The assembly of claim 1, wherein:
   a coefficient of friction between said spring means and one of said first surface and said second surface is greater than the tangent of one half of said angle.

10. The assembly of claim 1, wherein:
    said spring means is unitary.

11. The assembly of claim 1, wherein:
    said spring means and said retainer member cooperate to apply a force to the disk that does not exceed the weight of said retainer member.

* * * * *

UNITED STATES PATENT AND TRADEMARK OFFICE
CERTIFICATE OF CORRECTION

PATENT NO. : 5,270,999
DATED : December 14, 1993
INVENTOR(S) : Chessman, et al

It is certified that error appears in the above-indentified patent and that said Letters Patent is hereby corrected as shown below:

Column 3, line 50, after "9a", please insert a comma(,).
Column 6, line 13, after the word "angle" "W $<$ 2X" should read --W $\leq$ 2X--.
Column 6, line 16, after the word "relationship," "W $\leq$ 2X" should read --W $\leq$ 2X--.
Column 6, line 30, please delete "30".
Claim 4, column 8, line 15, please delete "0. to 90°" and insert therefore --0° to 90°--.

Signed and Sealed this

Twelfth Day of July, 1994

Attest:

BRUCE LEHMAN

*Attesting Officer*  *Commissioner of Patents and Trademarks*